United States Patent
Ma et al.

(10) Patent No.: US 12,211,274 B2
(45) Date of Patent: Jan. 28, 2025

(54) WEAKLY SUPERVISED ACTION SELECTION LEARNING IN VIDEO

(71) Applicant: The Toronto-Dominion Bank, Toronto (CA)

(72) Inventors: Junwei Ma, Toronto (CA); Satya Krishna Gorti, Toronto (CA); Maksims Volkovs, Toronto (CA); Guangwei Yu, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 470 days.

(21) Appl. No.: 17/716,996

(22) Filed: Apr. 8, 2022

(65) Prior Publication Data

US 2022/0335718 A1  Oct. 20, 2022

Related U.S. Application Data

(60) Provisional application No. 63/176,858, filed on Apr. 19, 2021.

(51) Int. Cl.
*G06V 20/40* (2022.01)
*G06V 10/764* (2022.01)
(Continued)

(52) U.S. Cl.
CPC ............ *G06V 20/41* (2022.01); *G06V 10/764* (2022.01); *G06V 10/7747* (2022.01);
(Continued)

(58) Field of Classification Search
None
See application file for complete search history.

(56) References Cited

U.S. PATENT DOCUMENTS 9,928,526 B2 * 3/2018 Dereszynski ...... G06Q 30/0202
10,237,571 B1 * 3/2019 Kohn .................... H04N 19/513
(Continued)

FOREIGN PATENT DOCUMENTS

WO   WO-2019099226 A1 *  5/2019  ........... G06F 18/214
WO   WO2022/061319 A1    3/2022

OTHER PUBLICATIONS

Ma J. et al., "Weakly Supervised Action Selection Learning in Video", 2021 IEEE/CVF 1-20 Conference on Computer Vision and Pattern Recognition (CVPR), Jun. 20-25, 2021, pp. 7583-7592, [Online] [Retrieved on Jul. 8, 2022], Retrieved from the Internet URL: <https://ieeexplore.ieee.org/stamp/stamp.jsp?tp=&arnumber=9578460> also available at <https://openaccess.thecvf.com/content/CVPR202 I/papers/Ma_Weakly_ Supervised_ Action_ Selection_ Learning_in _Video_ CVPR _ 2021 _paper.pdf>.
(Continued)

*Primary Examiner* — Anand P Bhatnagar
(74) *Attorney, Agent, or Firm* — Patent Capital Group

(57) ABSTRACT

A video localization system localizes actions in videos based on a classification model and an actionness model. The classification model is trained to make predictions of which segments of a video depict an action and to classify the actions in the segments. The actionness model predicts whether any action is occurring in each segment, rather than predicting a particular type of action. This reduces the likelihood that the video localization system over-relies on contextual information in localizing actions in video. Furthermore, the classification model and the actionness model are trained based on weakly-labeled data, thereby reducing the cost and time required to generate training data for the video localization system.

20 Claims, 5 Drawing Sheets

(51) Int. Cl.
*G06V 10/774* (2022.01)
*G06V 10/82* (2022.01)
*G06V 20/70* (2022.01)

(52) U.S. Cl.
CPC .............. *G06V 10/82* (2022.01); *G06V 20/49* (2022.01); *G06V 20/70* (2022.01)

(56) References Cited

U.S. PATENT DOCUMENTS

| | | | |
|---|---|---|---|
| 10,319,209 B2 * | 6/2019 | Carlton-Foss | G06N 20/00 |
| 10,366,300 B1 * | 7/2019 | Flowers | G06V 20/597 |
| 10,739,775 B2 * | 8/2020 | Sun | G05D 1/0088 |
| 11,151,471 B2 * | 10/2021 | Niininen | H04L 41/147 |
| 11,221,681 B2 * | 1/2022 | Wang | G06F 18/24143 |
| 11,704,893 B2 * | 7/2023 | Ren | G06V 10/454 |
| | | | 386/241 |
| 11,808,473 B2 * | 11/2023 | Matsuura | A47L 11/4011 |
| 12,051,275 B2 * | 7/2024 | Yi | G06V 40/28 |
| 2021/0140670 A1 * | 5/2021 | Matsuura | G06N 7/01 |

OTHER PUBLICATIONS

PCT International Search Report and Written Opinion, PCT Application No. PCT/CA2022/050578, Aug. 2, 2022, 15 pages.

\* cited by examiner

WEAKLY SUPERVISED ACTION SELECTION LEARNING IN VIDEO

CROSS REFERENCE TO RELATED APPLICATION

The present disclosure relates to U.S. Patent Application No. 63/176,858, entitled "Weakly Supervised Action Selection Learning in Video" and filed on Apr. 19, 2021, which is hereby incorporated by reference.

BACKGROUND

Machine-learning models may be used to localize actions within videos. These video localization models may identify which segments within a video depict an action being performed, and may even identify the action being depicted by the segments. However, training data for these models can be time consuming and expensive to produce. Conventionally, these models are trained based on video data that has been labeled to indicate which segments of the video depict actions and what kinds of actions those segments depict. Generating this labeled training data typically requires a human to hand-label the video segments, which significantly increases the cost and time it takes to generate sufficient training data for the models. Thus, these models conventionally can be very difficult to train and use.

Additionally, these machine-learning models are prone to context-errors when identifying actions, meaning that these models may over-rely on the context within which an action takes place and under-rely on features that indicate whether the actual action is occurring. For example, for a conventional model that is trained to localize swimming actions within a video, the model may be overly sensitive to depictions of swimming pools in video data, since swimming typically occurs in swimming pools, and may identify video segments with swimming pools as depicting swimming even if there are no people in the swimming pool. Thus, these conventional machine-learning models are unreliable and may require more human effort to sort out segments that do not actually depict actions.

SUMMARY

A video localization system localizes actions within a video using a classification model and an actionness model. The classification model is a machine-learning model that is trained to generate action class predictions for video segments. An action class prediction for a video segment is a prediction for whether a video segment depicts an action of an action class. For example, a swimming action class prediction for a video segment may represent the likelihood that the video segment depicts swimming. The actionness model is a machine-learning model that generates actionness predictions for video segments. An actionness prediction for a video segment is a prediction for whether a video segment depicts any action, regardless of action class. For example, the actionness model may generate a similar actionness prediction for a video segment that depicts a person swimming as a video segment that depicts a person running.

The video localization system may use action class predictions from the classification model and actionness predictions from the actionness model to identify video segments of a video that depict an action. For example, the video localization system may use a linear combination of action class predictions and actionness predictions to identify video segments that depict actions and action classes for the depicted actions. Similarly, the video localization system may use a machine-learning model that is trained to identify video segments that depict actions based on action class predictions and actionness predictions. By using actionness predictions to localize videos, the video localization system reduces context errors by focusing more on a general notion of whether an action is being performed in the video segment. This prevents the video localization system from over-focusing on contextual information, thereby improving the results of the video localization system.

Additionally, the video localization system reduces the time and expense of training by using a weak supervision training method. The training data used by the video localization system has video-level action class labels, rather than video-segment labels. In other words, the training data includes labels that identify the action classes of actions that are depicted in a video as a whole, without necessarily indicating which video segments in the video depict those actions. To train the classification model based on the training data, the video localization system uses action class predictions to make video class predictions that represent likelihoods that action classes are depicted in the video. The video localization system trains the classification model based on whether those video class predictions correspond with video-level action class labels that represent the ground truth of whether the video depicts an action class. To train the actionness model, the video localization system identifies video segments that are most likely to depict an action of any action class based on action class predictions from the classification model and actionness predictions from the actionness models. The video localization system trains the actionness model by treating the identified video segments as positive examples of actions and the other video segments (i.e., the ones that were identified as likely to depict an action of any action class) as negative examples of actions.

By training the classification model and the actionness model based on video-level action class labels, the video localization system can be trained to localize video data based on training data that is less costly and time intensive to produce. Thus, the video localization system can be trained based on a larger set of training data, thereby increasing its performance in more contexts.

DETAILED DESCRIPTION

Figure 1A:
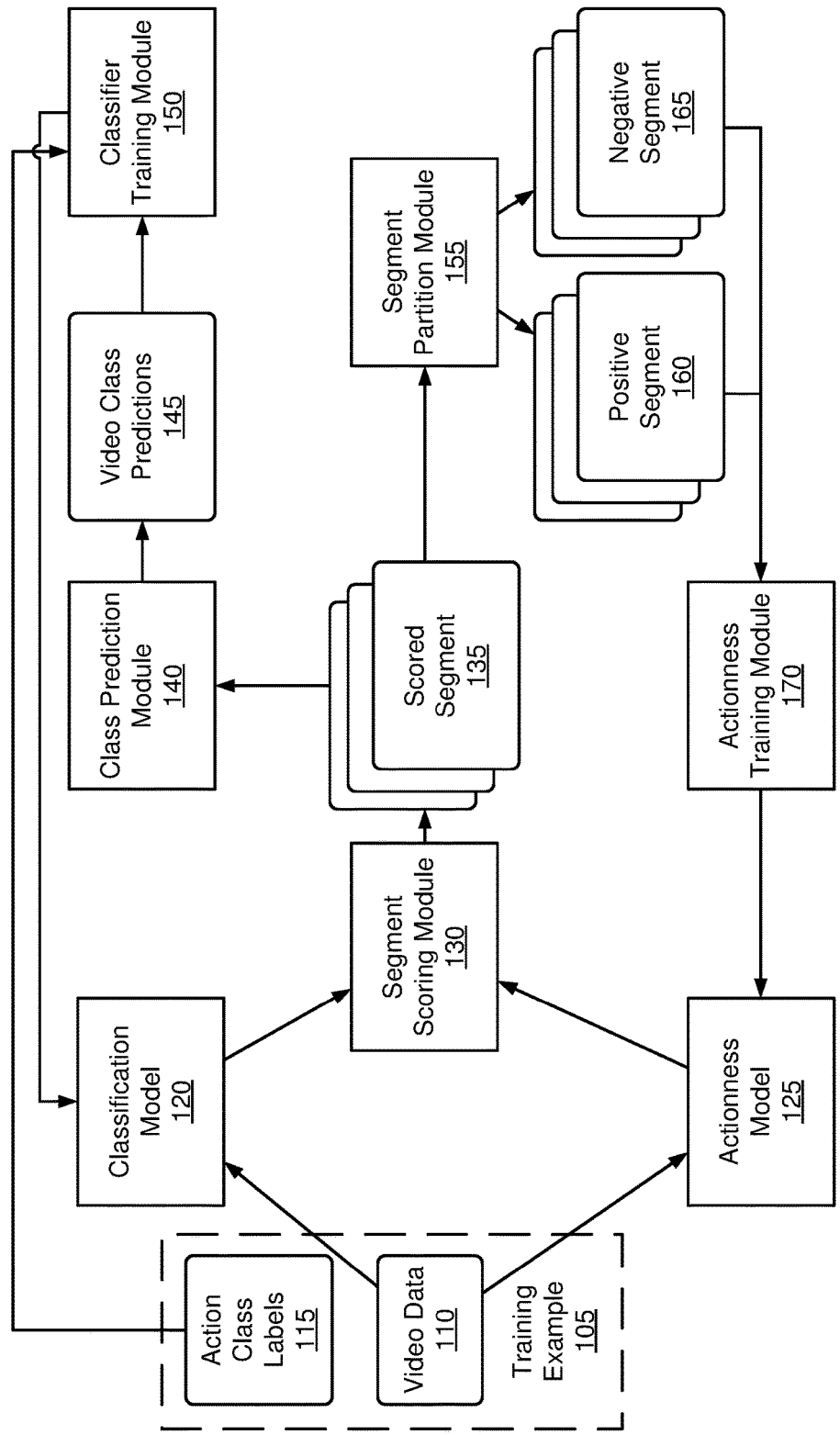
FIG. 1A illustrates data flow through an example video localization system when performing a training process based on a training example, in accordance with some embodiments.

FIG. 1A illustrates data flow through an example video localization system 100 when performing a training process based on a training example 105, in accordance with some embodiments. Alternative embodiments may include more, fewer, or different components from those illustrated in FIG.

1A, and the functionality of each component may be divided between the components differently from the description below. Additionally, each component may perform their respective functionalities in response to a request from a human, or automatically without human intervention.

The video localization system 100 uses training examples 105 to train the classification model 120 and the actionness model 125. A training example 105 may include video data 110 for a video for the video localization system 100 to localize. The video data 110 may include image data or audio data. The video may depict one or more actions being performed. An action is an act, movement, or gesture taken by a person or thing. Each action may be one of a set of action classes that identify what kind or type of action was taken. For example, action classes may include walking, running, swimming, biking, swinging a baseball bat or racket, speaking, or clapping.

The video data 110 includes video segments of the video. Video segments are sequential portions that makeup a video. For example, video segments may be individual frames of the video data or time intervals within the video. In some embodiments, the video data 110 includes video feature data describing characteristics of the video.

The training example 105 also includes one or more action class labels 115 for the video. An action class label is a label for the training example 105 that indicates that an action of a particular action class was performed within the video. For example, if a training example 105 includes an action class label for swimming, the action class label 115 indicates that a swimming action is depicted in the video. The training example 105 may include multiple action class labels 115, indicating that multiple actions of different action class types are depicted in the video. An action class label 115 may be a weak label, meaning that the action class label 115 may indicate that an action of an action class is depicted by the video without indicating which video segments depict the action of the action class. For example, if a video depicts a person who is walking in the first third of the video and not in later portions of the video, the action class label 115 may indicate that walking is depicted in the video without indicating where in the video the walking is depicted.

The classification model 120 is a machine-learning model (e.g., a neural network) that is trained by the video localization system 100 to generate predictions for action classes for video segments within a video. The classification model 120 receives the video data 110 for the video and generates action class predictions for each video segment in the video data 110. An action class prediction is a prediction that represents the likelihood that a video segment depicts an action of a particular action class. The classification model 120 may generate an action class prediction for each video segment, where each action class prediction represents a likelihood that the video segment depicts an action of an action class. The classification model 120 also may generate a set of action class predictions for each video segment. Each action class prediction of the set of action class predictions may be associated with an action class and may represent a likelihood that an action of the associated action class is depicted in the video segment. In some embodiments, the classification model 120 may perform some preprocessing steps on the video data 110. For example, the classification model 120 may perform some filtering, feature extraction, or normalization steps before applying the machine-learning model to the video data 110.

The actionness model 125 is a machine-learning model (e.g., a neural network) that is trained by the video localization system 100 to generate predictions for whether an action of any action class is depicted within video segments. The actionness model 125 receives the video data 110 for the video and generates an actionness prediction for each video segment in the video data 110. An actionness prediction is a prediction that represents the likelihood that an action of any action class is depicted in the video segment. In some embodiments, the actionness model 125 may perform some preprocessing steps on the video data 110. For example, the actionness model 125 may perform some filtering, feature extraction, or normalization steps before applying the machine-learning model to the video data 110.

The segment scoring module 130 scores video segments 135 from the video data 110 to identify video segments that are most likely to depict actions. The segment scoring module 130 generates action scores for the video segments 135 based on action class predictions generated by the classification model 120 and actionness predictions generated by the actionness model 125. The segment scoring module 130 may generate a set of action scores for each video segment, where each action score represents a likelihood that an action of an associated action class is depicted in the video segment. The segment scoring module 130 may use a linear combination (e.g., a convex combination) of action class predictions and actionness predictions to generate action scores for each video segment. The segment scoring module 130 may also use a machine learning model that is trained to generate action scores based on action class predictions and actionness predictions.

To train the classification model 120, the class prediction module 140 generates video class predictions 145 for the video. A video class prediction 145 for an action class is a predictions that represents the likelihood that the action class is depicted in the video. For example, the class prediction module 140 may predict that there is a 70% chance that the video depicts someone swimming at some point in the video.

To generate a video class prediction for an action class, the class prediction module 140 may identify a subset of scored segments 135 that are most likely to depict actions in the action class. For example, the class prediction module 140 may identify scored segments 135 with action scores for the action class that are above a threshold, or may identify the scored segments 135 with the top k action scores. The class prediction module 140 may then generate a video class prediction for an action class based on action scores for the identified scored segments 135. For example, the class prediction module 140 may use mean pooling to generate video class predictions 145 for the video based on action scores generated by the segment scoring module 130. In some embodiments, the class prediction module 140 uses action class predictions from the classification model 120 instead of, or in addition to, action scores from the segment scoring module 130 to generate video class predictions 145 for the video.

The classifier training module 150 updates the classification model 120 based on video class predictions 145 and the action class labels 115 of the training example 105. The classifier training module 150 may determine the performance of the classification model 120 based on whether the video class predictions 145 align with the action class labels 115. For example, if the video class predictions 145 for the action classes of the action class labels 115 represent a high likelihood that actions of the action classes are present, then the classifier training module 150 may determine that the classification model 120 performed well. Similarly, if the video class predictions 145 for the action classes of the action class labels 115 represent a low likelihood that the action classes are present, then the classifier training module 150 may determine that the classification model 120 performed poorly.

The classifier training module 150 may score the performance of the classification model 120 to update the classification model 120. The classifier training module 150 may use a loss function to score the performance of classification model 120. For example, the classifier training module 150 may use a loss function for a multi-instance learning objective to update the classification model 120 based on the training example 105.

To train the actionness model 125, the segment partition module 155 identifies positive segments 160 and negative segments 165. Positive segments 160 are video segments that are likely to depict an action. For example, positive segments 160 may be scored segments 135 that have high action scores. To identify positive segments 160, the segment partition module 155 may identify subsets of the scored segments 135 that are most likely to depict an action class. For example, the class prediction module 140 may identify scored segments 135 with action scores for an action class that are above a threshold, or may identify the scored segments 135 with the top k action scores. The segment partition module 155 may then generate a set of positive segments 160 that includes the scored segments 135 that are most likely to depict an action based on action scores for any action class. For example, the set of positive segments may include the five video segments that have the highest action scores for swimming and the five video segments that have the highest action scores for walking. In some embodiments, the set of positive segments 160 is the union of the subsets of identified scored segments 135 that are the most likely to depict an action for each of the action classes.

Negative segments 165 are video segments that are unlikely to depict an action. In some embodiments, the set of negative segments 165 are scored segments 135 that are not positive segments 160.

The actionness training module 170 updates the actionness model 125 based on the positive segments 160, the negative segments 165, and the actionness predictions generated by the actionness model 125. For example, the actionness training module 170 may determine that the actionness model 125 has performed well when the actionness predictions for positive segments 160 are high and the actionness predictions for negative segments 165 are low. Similarly, the actionness training module 170 may determine that the actionness model 125 has performed poorly when the actionness predictions for positive segments are low and the actionness predictions for negative segments 165 are high.

The actionness training module 170 may update the actionness model 125 based on the actionness predictions generated by the actionness model for the positive segments 160 and the negative segments 165. For example, the actionness training module 170 may apply a loss function that optimizes for high actionness scores for positive segments 160 and low actionness scores for negative segments 165. In some embodiments, the loss function is based on the Box-Cox transform.

Figure 1B:
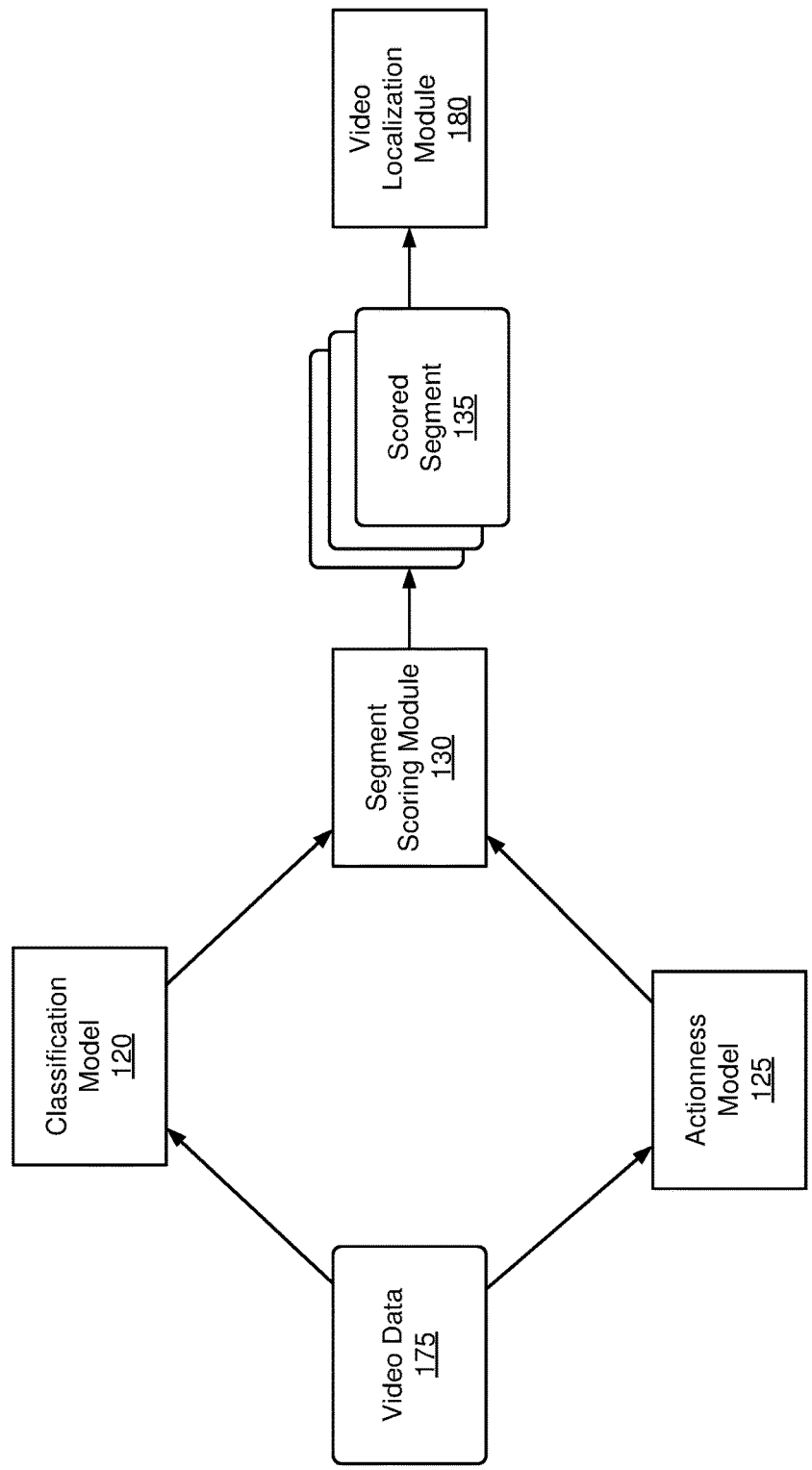
FIG. 1B illustrates data flow through an example video localization system when localizing video data, in accordance with some embodiments.

FIG. 1B illustrates data flow through an example video localization system 100 when localizing video data 175, in accordance with some embodiments. Alternative embodiments may include more, fewer, or different components from those illustrated in FIG. 1B, and the functionality of each component may be divided between the components differently from the description below. Additionally, each component may perform their respective functionalities in response to a request from a human, or automatically without human intervention.

The video localization system 100 receives video data 175 for a video to localize. The video data 175 may include image data and audio data for a video. The video data 175 includes a set of video segments that represent sequential portions of the video. The video localization system 100 may receive the video data 175 from another device or may retrieve the video data 175 from a data store.

The video localization system 100 provides the video data to the classification model 120. As described above, the classification model 120 generates action class predictions for video segments of the video data 175. The classification model 120 may generate an action prediction for each video segment, where each action class prediction represents a likelihood that the video segment depicts an action class. The classification model 120 also may generate a set of action class predictions for each video segment. Each action class prediction of the set of action class predictions may be associated with an action class and may represent a likelihood that an action of the associated action class is depicted in the video segment.

The actionness model 125 receives the video data 175 and generates an actionness prediction for each video segment in the video data. The actionness predictions for the video segments represent the likelihood that the video segment depicts an action.

The segment scoring module 130 receives action class predictions from the classification model 120 and actionness predictions from the actionness model 125 and generates action scores for the video segments. The segment scoring module 130 may generate multiple action scores for a video segment to represent likelihoods that different action classes are depicted in the video segment. The segment scoring module 130 generates action scores based on action class predictions and actionness predictions. In some embodiments, the segment scoring module 130 generates action scores using a linear combination of action class predictions and actionness predictions. The segment scoring module 130 also may use a machine-learning model that is trained to generate action scores for video segments.

The segment scoring module 130 provides the score segments 135 to the video localization module 180. The video localization module 180 localizes which of the scored segments mostly likely depict an action. The video localization module 180 may select a set of scored segments 135 that represent an action based on the action scores generated by the segment scoring module 130. For example, the video localization module 180 may apply a threshold to the action scores to determine which segments, if any, depict an action. The video localization module 180 also may determine, based on the action scores, an action class for any actions depicted in the scored segments 135. For example, the video localization module 130 may consider action scores associated with a first action class to identify video segments that depict actions within that action class. The video localization module 130 may then consider action scores associated with a different action class to identify video segments that depict actions within the other action class.

In some embodiments, the segment scoring module 130 scores video segments based on action class predictions and not based on actionness predictions. For example, during the training process for the classification model 120 and the actionness model 125, the classification model 120 may receive sufficient actionness signals from the use of action scores to generate video class predictions 145 that the classification model 125 generates action class predictions that incorporate actionness in the prediction without the need for a separate actionness prediction from the actionness model. The segment scoring module 130 may then simply use action class predictions from the classification model 120 directly to score video segments, thereby eliminating the requirement to apply the actionness model 125 to the video data and reducing the computational requirements of operating the video localization system 100.

Figure 2:
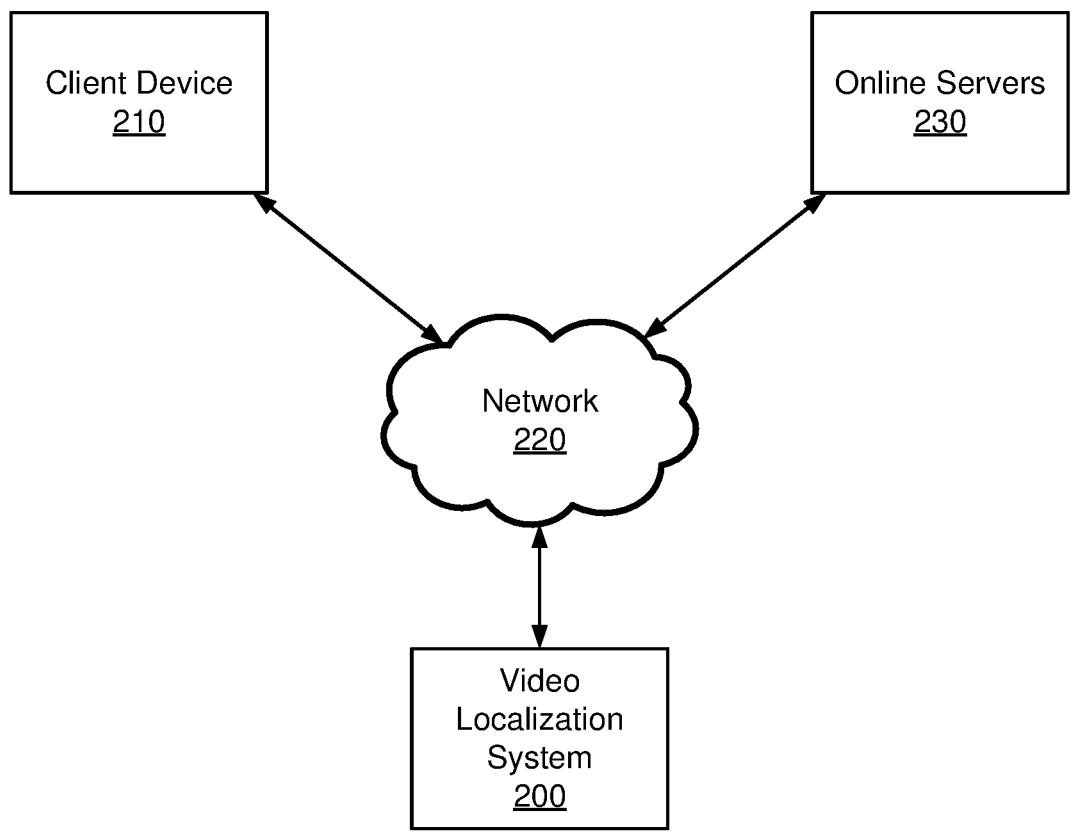
FIG. 2. is an example system environment for a video localization system, in accordance with some embodiments.

FIG. 2. is an example system environment for a video localization system, in accordance with some embodiments. Alternative embodiments may include more, fewer, or different components from those illustrated in FIG. 2, and the functionality of each component may be divided between the components differently from the description below. Additionally, each component may perform their respective functionalities in response to a request from a human, or automatically without human intervention.

The video localization system 200 operates on one or more computing devices. For example, the video localization system may include a server, a desktop computer, a laptop computer, a smartphone, or a tablet.

The video localization system 200 may communicate with a client device 210 over a network 220. The client device 210 can be a personal or mobile computing device, such as a smartphone, a tablet, a laptop computer, or desktop computer. In some embodiments, the client device 210 executes a client application that uses an application programming interface (API) to communicate with the video localization system 200 through the network 220.

The video localization system may receive video data from the client device 210 and may provide localized video data to the client device 210. The video localization system 200 may indicate which video segments of video data received from the client device 210 depict actions, and may indicate an action class for actions depicted in the video data.

The video localization system 200 may additionally communicate with one or more online servers 230. For example, the video localization system 200 may receive video data from an online server 230 and may provide localized video data to the online server 230. The online server 230 may be operated by the proprietor of the video localization system 200 or may be operated by a third party.

The network 220 may comprise any combination of local area and wide area networks employing wired or wireless communication links. In some embodiments, the network 220 uses standard communications technologies and protocols. For example, the network 220 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 220 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 220 may be represented using any format, such as hypertext markup language (HTML) or extensible markup language (XML). In some embodiments, all or some of the communication links of the network 220 may be encrypted.

Figure 3:
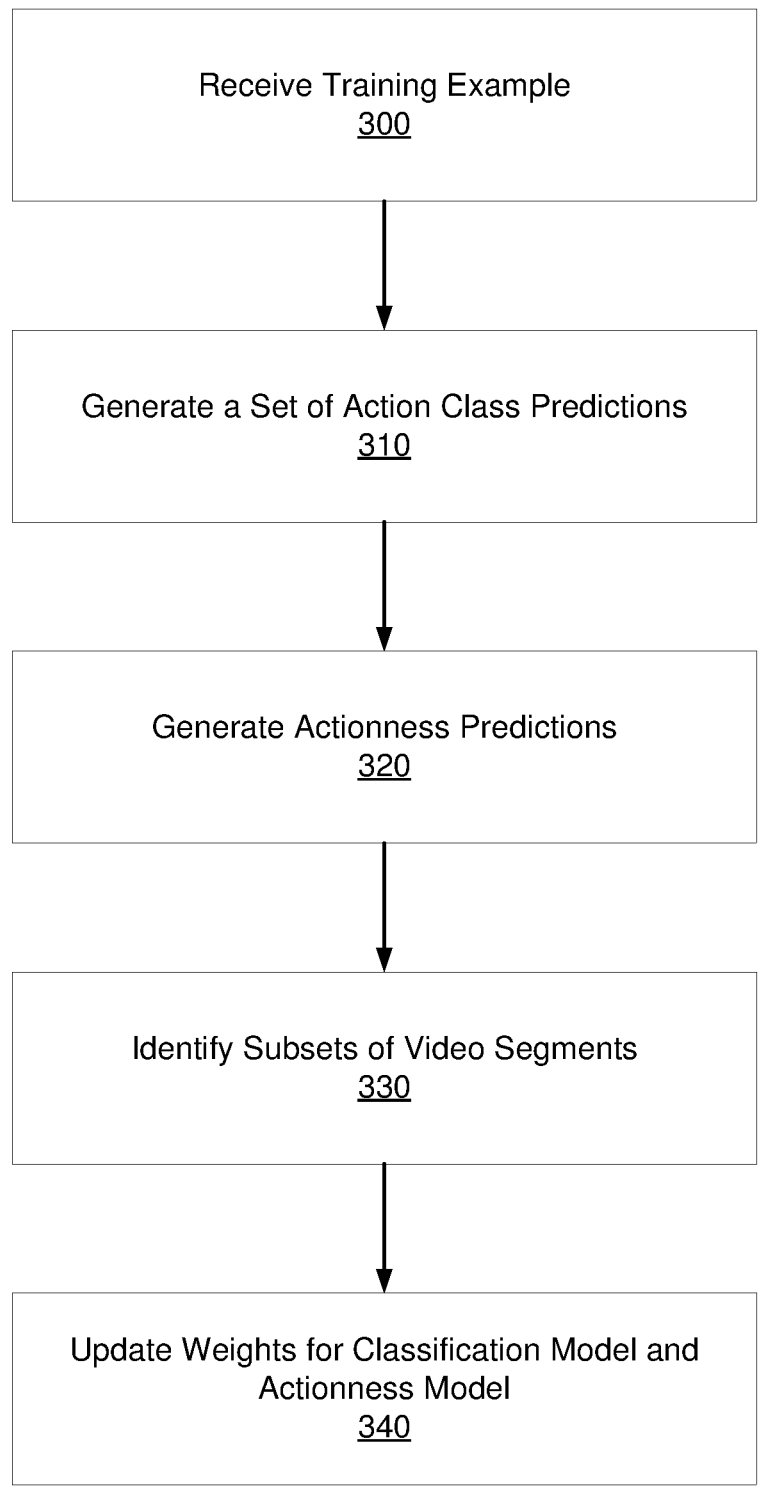
FIG. 3 is a flowchart for a method of training a video localization system, in accordance with some embodiments.

FIG. 3 is a flowchart for a method of training a video localization system, in accordance with some embodiments. Alternative embodiments may include more, fewer, or different steps from those illustrated in FIG. 3, and the steps may be performed in a different order from that illustrated in FIG. 3. Additionally, each of these steps may be performed automatically by a video localization system without human intervention.

The video localization system receives 300 a training example. The training example may include video data for a video, where the video data include video segments of the video. The training example also may include action class labels for action classes depicted in the video.

The video localization system generates 310 a set of action class predictions for each video segment of the video data in the training example. The set of action class predictions for a video segment represent the likelihoods that a set of action classes are depicted in the video segment. For example, the set of action class predictions may include an action class prediction for swimming that represents the likelihood that the video segment depicts swimming. The video localization system generates 310 the set of action class predictions by applying a classification model to the video data of the training example.

The video localization system generates 320 an actionness prediction for each video segment of the video data in the training example. An actionness prediction for a video segment represents a likelihood that the video segment depicts an action.

The video localization system identifies 330 subsets of the video segments from the training example. Each subset may be associated with an action class of the set of action classes, and each subset may include video segments that are most likely to depict the associated action class. For example, each subset may include a pre-determined number of video segments, and the video segments in the subset may be the video segments that are most likely to depict the action class.

The video localization system may identify the subsets of the video segments based on a set of action scores for each video segment. The set of action scores for a video segment may represent likelihoods that the video segment depicts an action class. Each action score for an action class is generated based on an action class prediction for that action class and an actionness prediction for the video segment. The video localization system may identify the subset of video segments for an action class by identifying video segments with the highest action scores for the action class.

The video localization system updates 340 the weights for the classification model and the actionness model based on the action scores for each video segment. For example, the video localization system may update the classification model by generating video class predictions that represent the predicted likelihood that the video depicts an action class associated with the video class predictions. The video localization system may then compare these video class predictions with the ground truth action class labels from the training example to update the weights for the classification model.

To update the weights of the actionness model, the video localization system may identify positive video segments and negative video segments. Positive video segments are video segments that are most likely to represent an action of any action class and negative video segments are video segments that are less likely to represent an action of any action class. In some embodiments, the positive video segments are all of the video segments that are in any of the identified 330 subsets of video segments, and the negative video segments are the video segments that are not in an identified 330 subset of video segments. The video localization system may update the weights for the actionness model by using the positive video segments as positive examples and the negative video segments as negative examples.

The video localization system may repeat the steps described above for each of a set of training example stored by the video localization system. In some embodiments, the video localization system initializes a set of weights for the classification model and the actionness model before performing the steps described above.

Figure 4:
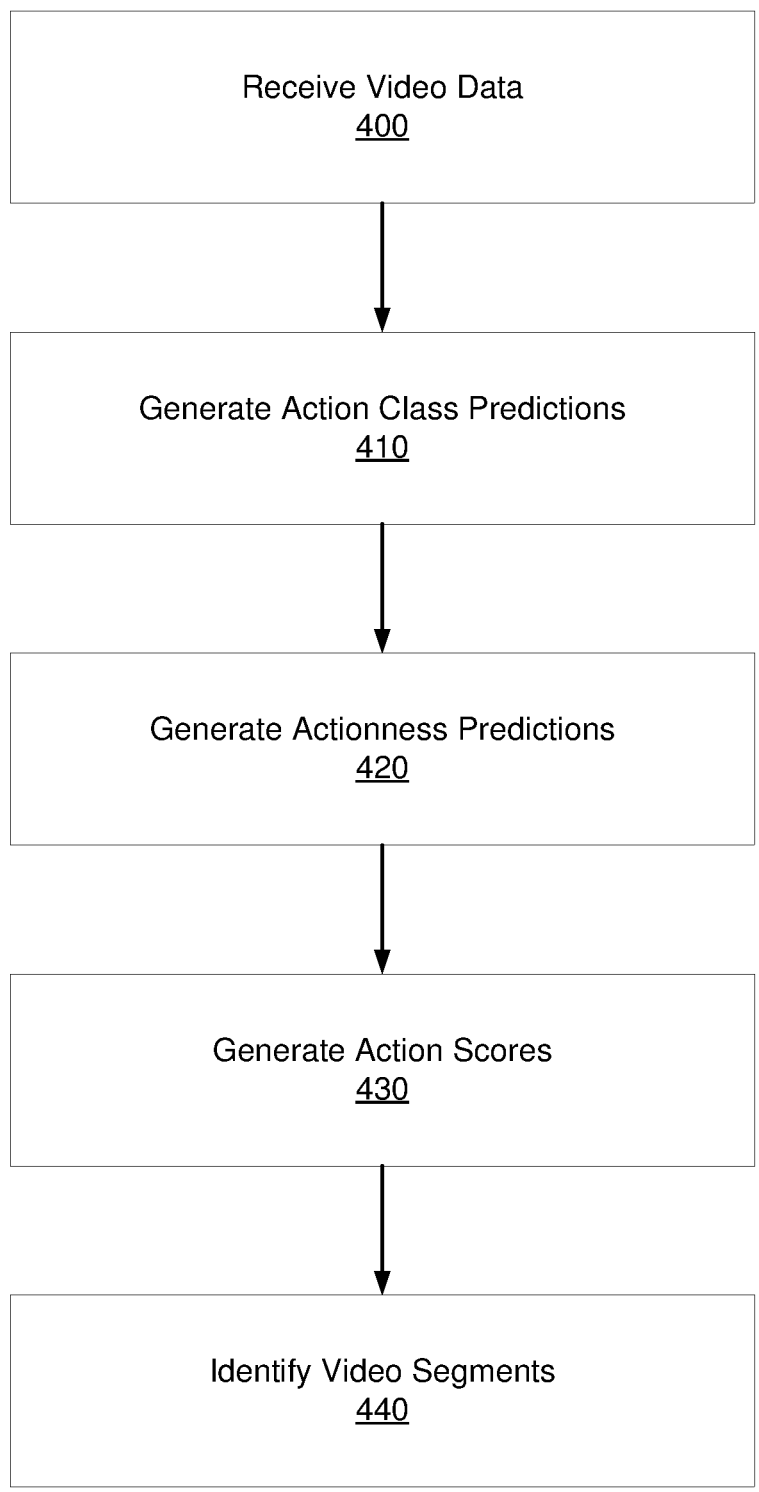
FIG. 4 is a flowchart for a method of localizing a video by a video localization system, in accordance with some embodiments.

FIG. 4 is a flowchart for a method of localizing a video by a video localization system, in accordance with some embodiments. Alternative embodiments may include more, fewer, or different steps from those illustrated in FIG. 4, and the steps may be performed in a different order from that illustrated in FIG. 4. Additionally, each of these steps may be performed automatically by a video localization system without human intervention.

The video localization system receives 400 video data describing a video. The video localization system may receive the video data from a client device or an online server. The video data includes video segments that are sequential portions of the video.

The video localization system generates 410 a set of action class predictions for each video segment of the received video data. The set of action class predictions for a video segment represent the likelihoods that a set of action classes are depicted in the video segment. For example, the set of action class predictions may include an action class prediction for swimming that represents the likelihood that the video segment depicts swimming. The video localization system generates 410 the set of action class predictions by applying a classification model to the video data.

The video localization system generates 420 an actionness prediction for each video segment of the video data. An actionness prediction for a video segment represents a likelihood that the video segment depicts an action.

The video localization system generates 430 a set of action scores for each video segment. The set of action scores for a video segment may represent likelihoods that the video segment depicts an action class. Each action score for an action class is generated based on an action class prediction for that action class and an actionness prediction for the video segment. The video localization system may identify 440 video segments that depict an action for an action class based on the action scores for each video segment. For example, the video localization system may identify video segments as video segments that depict an action of an action class based on a threshold for the action score corresponding to that action class of the video segments.

In some embodiments, the video localization system identifies video segments based on the action class predictions directly, rather than generating actionness predictions and action scores. In these embodiments, the action class predictions may be treated as the action scores for identifying video segments as depicting actions.

Additional Considerations

The foregoing description of the embodiments has been presented for the purpose of illustration; it is not intended to be exhaustive or to limit the patent rights to the precise pages disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some embodiments, a software module is implemented with a computer program product comprising one or more computer-readable media containing computer program code or instructions, which can be executed by a computer processor for performing any or all of the steps, operations, or processes described. In some embodiments, a computer-readable medium comprises one or more computer-readable media that, individually or together, comprise instructions that, when executed by one or more processors, cause the one or more processors to perform, individually or together, the steps of the instructions stored on the one or more computer-readable media. Similarly, a processor comprises one or more processors or processing units that, individually or together, perform the steps of instructions stored on a computer-readable medium.

Embodiments may also relate to an apparatus for performing the operations herein. This apparatus may be specially constructed for the required purposes, or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

The description herein may describe processes and systems that use machine-learning models in the performance of their described functionalities. A "machine-learning model," as used herein, comprises one or more machine-learning models that perform the described functionality. Machine-learning models may be stored on one or more computer-readable media with a set of weights. These weights are parameters used by the machine-learning model to transform input data received by the model into output data. The weights may be generated through a training process, whereby the machine-learning model is trained based on a set of training examples and labels associated with the training examples. For example, the weights may be initialized for the machine-learning model (e.g., by assigning the weights initial values or by using weights from a prior machine-learning model) and the weights are updated based on an iterative process through a set of training examples. The machine-learning model may be applied to training data of a training example and the output of the machine-learning model may be evaluated by a loss function. For example, the loss function may compare the output of the machine-learning model to a ground-truth label associated with the training example, and may score the performance of the machine-learning model based on the comparison. The machine-learning model may update the weights of machine-learning model based on the comparison performed by the loss function (e.g., through a back-propagation process). The weights of the machine-learning model may be stored on one or more computer-readable media, and are used by a system when applying the machine-learning model to new data.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

As used herein, the terms "comprises," "comprising," "includes," "including," "has," "having," or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive "or" and not to an exclusive "or". For example, a condition "A or B" is satisfied by any one of the following: A is true (or present) and B is false (or not present), A is false (or not present) and B is true (or present), and both A and B are true (or present). Similarly, a condition "A, B, or C" is satisfied by any combination of A, B, and C having at least one element in the combination that is true (or present). As a not-limiting example, the condition "A, B, or C" is satisfied by A and B are true (or present) and C is false (or not present). Similarly, as another not-limiting example, the condition "A, B, or C" is satisfied by A is true (or present) and B and C are false (or not present).

What is claimed is:

1. A system comprising:
   a processor; and
   a non-transitory computer-readable medium storing a classification model that is trained to predict action classes for video segments of a video, wherein the classification model is trained on each training example of a plurality of training examples by performing steps comprising:
      applying the classification model to video data for a video of the training example to generate action class predictions for video segments of the video, wherein an action class prediction represents a likelihood that an action of an action class is depicted in a video segment, wherein an action class indicates a type of action;
      applying an actionness model to the video data of the training example to generate actionness predictions for the video segments of the video, wherein an actionness prediction represents a likelihood that an action is depicted in a video segment;
      generating one or more video class predictions based on the action class predictions generated by the classification model and the actionness predictions generated by the actionness model, wherein a video class prediction represents a likelihood that an action of an action class is depicted in the video of the training example; and
      updating the classification model by comparing the one or more video class predictions with one or more action class labels associated with the training example, wherein an action class label is a label of whether the video depicts an action of an action class.

2. The system of claim 1, wherein the computer-readable medium further stores the actionness model, and wherein the actionness model is trained based on the training example by:
   identifying a set of video segments as being likely to depict an action based on the action class predictions generated by the classification model and the actionness predictions generated by the actionness model; and
   updating the actionness model to predict whether an action is depicted in a video segment based on the identified set of video segments.

3. The system of claim 1, wherein generating one or more video class predictions comprises:
   identifying, for each of one or more action classes, a set of video segments as being likely to depict an action of the action class, wherein the set of video segments are identified based on the action class predictions generated by the classification model and the actionness predictions generated by the actionness model; and
   generating a video class prediction for each of the one or more action classes based on action class predictions for the set of video segments associated with the action class.

4. The system of claim 1, wherein identifying a set of video segments for an action class comprises identifying a pre-determined number of video segments that are most likely to depict an action of the action class based on the action class predictions generated by the classification model and the actionness predictions generated by the actionness model.

5. The system of claim 1, wherein a video segment is one of a frame in the video or a time interval in the video.

6. A method comprising:
   training a classification model to predict action classes for video segments of a video, wherein the classification model is trained on each training example of a plurality of training examples by performing steps comprising:
      applying the classification model to video data for a video of the training example to generate action class predictions for video segments of the video, wherein an action class prediction represents a likelihood that an action of an action class is depicted in a video segment, wherein an action class indicates a type of action;
      applying an actionness model to the video data of the training example to generate actionness predictions for the video segments of the video, wherein an actionness prediction represents a likelihood that an action is depicted in a video segment;
      generating one or more video class predictions based on the action class predictions generated by the classification model and the actionness predictions generated by the actionness model, wherein a video class prediction represents a likelihood that an action of an action class is depicted in the video of the training example; and updating the classification model by comparing the one or more video class predictions with one or more action class labels associated with the training example, wherein an action class label is a label of whether the video depicts an action of an action class.

7. The method of claim 6, further comprising training the actionness model based on each training example of the plurality of training examples by performing steps comprising:
identifying a set of video segments as being likely to depict an action based on the action class predictions generated by the classification model and the actionness predictions generated by the actionness model; and
updating the actionness model to predict whether an action is depicted in a video segment based on the identified set of video segments.

8. The method of claim 6, wherein generating one or more video class predictions comprises:
identifying, for each of one or more action classes, a set of video segments as being likely to depict an action of the action class, wherein the set of video segments are identified based on the action class predictions generated by the classification model and the actionness predictions generated by the actionness model; and
generating a video class prediction for each of the one or more action classes based on action class predictions for the set of video segments associated with the action class.

9. The method of claim 6, wherein identifying a set of video segments for an action class comprises identifying a pre-determined number of video segments that are most likely to depict an action of the action class based on the action class predictions generated by the classification model and the actionness predictions generated by the actionness model.

10. The method of claim 6, wherein a video segment is one of a frame in the video or a time interval in the video.

11. A non-transitory computer-readable medium storing a set of weights for a video localization system, wherein the set of weights are generated by a process comprising:
accessing the set of weights, wherein the set of weights comprise:
a set of weights for a classification model for predicting action classes within video segments; and
a set of weights for an actionness model for predicting whether a video segment depicts an action;
storing a set of training examples, wherein each training example comprises:
video data for a video, wherein the video data comprises a plurality of video segments of the video; and
an action class label indicating an action class for an action performed in the video;
for each training example in the set of training examples:
generating a set of action class predictions for each video segment in the plurality of video segments of the training example by applying the classification model to the video data of the training example, where each action class prediction is associated with an action class of a set of action classes and represents a likelihood that the video segment depicts an action of the associated action class;
generating an actionness prediction for each video segment in the plurality of video segments by applying the actionness model to the video data, where each actionness prediction represents a likelihood that an action is depicted by the video segment;
identifying, for each action class of the set of action classes, a subset of the plurality of video segments as being likely to depict an action of the action class based on the set of action class predictions and the actionness prediction for each video segment of the plurality of video segments;
updating the set of weights for the classification model based on an identified subset of the plurality of video segments associated with the action class indicated by the action class label for the training example; and
updating the set of weights for the actionness model based on each of the identified subsets of the plurality of video segments; and
storing the updated set of weights for the classification model and the updated set of weights for the actionness model on the computer-readable medium.

12. The computer-readable medium of claim 11, wherein a video segment of the plurality of video segments is one of a frame in the video or a time interval in the video.

13. The computer-readable medium of claim 11, wherein identifying a subset of video segments for an action class of the set of action classes comprises identifying, based on actionness predictions and action class predictions for the action class associated with each video segment, a pre-determined number of video segments that are most likely to depict an action of the action class.

14. The computer-readable medium of claim 11, wherein each training example in the set of training examples comprises a plurality of action class labels for a plurality of action classes.

15. The computer-readable medium of claim 14, wherein the set of weights for the classification model is updated based on an identified subset of the plurality of video segments associated with each action class of the plurality of action classes of the training example.

16. The computer-readable medium of claim 11, wherein updating the set of weights for the classification model comprises:
generating a video class prediction for the action class of the action class label based on action class predictions associated with the identified subset of video segments associated with the action class of the action class label, wherein the video class prediction represents a likelihood that an action of the action class is depicted in the video; and
updating the set of weights of the classification model based on the video class prediction and the action class label.

17. The computer-readable medium of claim 11, wherein updating the set of weights for the actionness model comprises:
identifying a set of positive video segments based on action class predictions and actionness predictions of the plurality of video segments, wherein the set of positive video segments comprises video segments that are most likely to represent an action of any action class of the set of action classes; and
updating the set of weights for the actionness model based on the set of positive video segments, wherein the set of positive video segments are treated as positive training examples to train the actionness model.

18. The computer-readable medium of claim 17, wherein updating the set of weights for the actionness model comprises:

identifying a set of negative video segments, wherein the set of negative video segments comprises video segments that are not in the set of positive video segments; and updating the set of weights for the actionness model based on the set of negative video segments, wherein the set of negative segments are treated as negative training examples to train the actionness model.

19. The computer-readable medium of claim 11, wherein the classification model comprises a neural network.

20. The computer-readable medium of claim 11, wherein the actionness model comprises a neural network.

* * * * *